(12) United States Patent
Williamson

(10) Patent No.: US 8,417,739 B2
(45) Date of Patent: Apr. 9, 2013

(54) SYSTEMS AND METHODS FOR OBJECT-BASED MODELING USING HIERARCHICAL MODEL OBJECTS

(75) Inventor: Eric Williamson, Holly Springs, NC (US)

(73) Assignee: Red Hat, Inc., Raleigh, NC (US)

(*) Notice: Subject to any disclaimer, the term of this patent is extended or adjusted under 35 U.S.C. 154(b) by 252 days.

(21) Appl. No.: 12/475,458

(22) Filed: May 29, 2009

(65) Prior Publication Data

US 2010/0306272 A1    Dec. 2, 2010

(51) Int. Cl.
G06F 17/30 (2006.01)
(52) U.S. Cl. .......................... 707/804; 707/810
(58) Field of Classification Search .................. 707/804, 707/810
See application file for complete search history.

(56) References Cited

U.S. PATENT DOCUMENTS

| | | | |
|---|---|---|---|
| 5,890,167 A | 3/1999 | Bridge, Jr. et al. |
| 5,978,796 A | 11/1999 | Malloy et al. |
| 6,035,300 A | 3/2000 | Cason et al. |
| 6,360,188 B1 | 3/2002 | Freidman et al. |
| 6,366,922 B1 | 4/2002 | Althoff |
| 6,434,435 B1 | 8/2002 | Tubel et al. |
| 6,434,544 B1 | 8/2002 | Bakalash et al. |
| 6,594,672 B1 | 7/2003 | Lampson et al. |
| 6,609,123 B1 | 8/2003 | Cazemier et al. |
| 6,735,590 B1 | 5/2004 | Shoup et al. |
| 6,931,418 B1 | 8/2005 | Barnes |
| 7,039,871 B2 | 5/2006 | Cronk |
| 7,093,194 B2 | 8/2006 | Nelson |
| 7,139,766 B2 | 11/2006 | Thomson et al. |
| 7,152,062 B1 | 12/2006 | Draper et al. |
| 7,177,329 B2 | 2/2007 | Kobayashi |
| 7,240,067 B2 | 7/2007 | Timmons |
| 7,299,241 B2 | 11/2007 | Reed et al. |
| 7,660,822 B1 | 2/2010 | Pfleger |
| 7,716,257 B2 | 5/2010 | Thomson et al. |
| 2001/0049678 A1 | 12/2001 | Yaginuma |
| 2002/0029207 A1 | 3/2002 | Bakalash et al. |
| 2002/0035562 A1 | 3/2002 | Roller et al. |
| 2002/0083034 A1 | 6/2002 | Orbanes et al. |
| 2002/0087516 A1 | 7/2002 | Cras et al. |

(Continued)

OTHER PUBLICATIONS

Using OLAP and Multi-Dimensional data for decision making, Hasan et al. IEEE 2001.

(Continued)

*Primary Examiner* — Amy Ng
*Assistant Examiner* — Alexander Khong
(74) *Attorney, Agent, or Firm* — Lowenstein Sandler LLP

(57) ABSTRACT

Embodiments relate to systems and methods for object-based modeling using hierarchical model objects. A modeling client can host modeling logic and an application programming interface (API) to create, access, manipulate, and import/export modeling objects used in modeling applications, such as engineering, medical, financial, and other modeling platforms. In aspects, the source data accepted into the modeling client can include consumer or business-level applications, whose spreadsheet, database or other content can be extracted and encapsulated in extensible markup language (XML) or other object-oriented format. Various model objects can be extracted from source data, and aggregated into a hierarchical model object encapsulating and preserving the underlying object layers. In aspects, one or more of the model object layers can functionally combine at least two other layers, to relate levels of data in hierarchical fashion. The modeling client can exchange composite or other modeling objects with external platforms on a programmatic basis.

20 Claims, 6 Drawing Sheets

U.S. PATENT DOCUMENTS

| | | |
|---|---|---|
| 2002/0169658 A1 | 11/2002 | Adler |
| 2003/0114950 A1 | 6/2003 | Ruth et al. |
| 2003/0115194 A1 | 6/2003 | Pitts et al. |
| 2003/0115207 A1 | 6/2003 | Bowman et al. |
| 2003/0120372 A1 | 6/2003 | Ruth et al. |
| 2003/0126114 A1 | 7/2003 | Tedesco |
| 2003/0184585 A1* | 10/2003 | Lin et al. .................. 345/763 |
| 2003/0225736 A1 | 12/2003 | Bakalash et al. |
| 2004/0039736 A1 | 2/2004 | Kilmer et al. |
| 2004/0133552 A1 | 7/2004 | Greenfield et al. |
| 2004/0139061 A1 | 7/2004 | Colossi et al. |
| 2004/0205617 A1 | 10/2004 | Light |
| 2004/0252136 A1 | 12/2004 | Bhatt et al. |
| 2005/0004904 A1 | 1/2005 | Kearney et al. |
| 2005/0010566 A1 | 1/2005 | Cushing et al. |
| 2005/0015220 A1* | 1/2005 | Ramchandi ................ 702/188 |
| 2005/0060252 A1 | 3/2005 | Doddington |
| 2005/0060382 A1 | 3/2005 | Spector et al. |
| 2006/0004833 A1 | 1/2006 | Trivedi et al. |
| 2006/0024653 A1 | 2/2006 | Battagin et al. |
| 2006/0036707 A1 | 2/2006 | Singh et al. |
| 2006/0136462 A1 | 6/2006 | Campos et al. |
| 2006/0173906 A1 | 8/2006 | Chu et al. |
| 2006/0190844 A1 | 8/2006 | Binder et al. |
| 2006/0262145 A1 | 11/2006 | Zhang et al. |
| 2007/0022093 A1 | 1/2007 | Wyatt et al. |
| 2007/0027904 A1 | 2/2007 | Chow et al. |
| 2007/0088757 A1 | 4/2007 | Mullins et al. |
| 2007/0094236 A1 | 4/2007 | Otter et al. |
| 2007/0150820 A1 | 6/2007 | Salvo |
| 2007/0208721 A1 | 9/2007 | Zaman et al. |
| 2007/0211056 A1 | 9/2007 | Chakraborty et al. |
| 2008/0140696 A1* | 6/2008 | Mathuria ................... 707/102 |
| 2008/0172405 A1 | 7/2008 | Feng et al. |
| 2008/0243778 A1 | 10/2008 | Behnen et al. |
| 2008/0294596 A1 | 11/2008 | Xiong |
| 2008/0320023 A1 | 12/2008 | Fong |
| 2009/0006992 A1 | 1/2009 | Gilboa |
| 2009/0172042 A1 | 7/2009 | Bracha et al. |
| 2009/0193039 A1 | 7/2009 | Bradley et al. |
| 2009/0222470 A1 | 9/2009 | Kemp et al. |
| 2010/0057700 A1 | 3/2010 | Williamson |
| 2010/0057777 A1 | 3/2010 | Williamson |
| 2010/0131456 A1 | 5/2010 | Williamson |
| 2010/0169299 A1 | 7/2010 | Pollara |
| 2010/0305922 A1 | 12/2010 | Williamson |
| 2010/0306254 A1 | 12/2010 | Williamson |
| 2010/0306255 A1 | 12/2010 | Williamson |
| 2010/0306272 A1 | 12/2010 | Williamson |
| 2010/0306281 A1 | 12/2010 | Williamson |
| 2010/0306340 A1 | 12/2010 | Williamson |
| 2010/0306682 A1 | 12/2010 | Williamson |
| 2011/0050728 A1 | 3/2011 | Williamson |
| 2011/0054854 A1 | 3/2011 | Williamson |
| 2011/0055680 A1 | 3/2011 | Williamson |
| 2011/0055761 A1 | 3/2011 | Williamson |
| 2011/0055850 A1 | 3/2011 | Williamson |
| 2011/0078199 A1 | 3/2011 | Williamson |
| 2011/0078200 A1 | 3/2011 | Williamson |
| 2011/0131176 A1 | 6/2011 | Williamson |
| 2011/0131220 A1 | 6/2011 | Williamson |
| 2011/0158106 A1 | 6/2011 | Williamson |
| 2011/0161282 A1 | 6/2011 | Williamson |
| 2011/0161374 A1 | 6/2011 | Williamson |
| 2011/0161378 A1 | 6/2011 | Williamson |

OTHER PUBLICATIONS

A new OLAP aggregation based on the AHC technique, Massaoud et al, DOLAP'04 Nov. 12-13, 2004.

Interactive hierarchical dimension ordering, spacing and filtering for exploration of high dimension datasets, Yang et al, IEEE symposium on information visualization 2003.

Williamson, "Systems and Methods for Interpolating Conformal Input Sets Based on a Target Output", U.S. Appl. No. 12/872,779, filed Aug. 31, 2010.

Williamson, "Systems and Methods for Interpolating Alternative Input Sets Based on User-Weighted Variables", U.S. Appl. No. 12/951,881, filed Nov. 22, 2010.

Williamson, "Systems and Methods for Tracking Differential Changes in Conformal Data Input Sets", U.S. Appl. No. 12/951,937, filed Nov. 22, 2010.

Williamson, "Systems and Methods for Training a Self-Learning Network Using Interpolated Input Sets Based on a Target Output", U.S. Appl. No. 12/872,935, filed Aug. 31, 2010.

Williamson, "Systems and Methods for Embedding Interpolated Data Object in Application Data File", U.S. Appl. No. 12/955,717, filed Nov. 29, 2010.

Williamson, "Systems and Methods for Generating Interpolated Input Data Sets Using Reduced Input Source Objects", U.S. Appl. No. 12/955,768, filed Nov. 29, 2010.

Williamson, "Systems and Methods for Filtering Interpolated Input Data Based on User-Supplied or Other Approximation Constraints", U.S. Appl. No. 12/955,790, filed Nov. 29, 2010.

Williamson, "Systems and Methods for Binding Multiple Interpolated Data Objects", U.S. Appl. No. 12/955,811, filed Nov. 29, 2010.

Williamson, "Systems and Methods for Generating Portable Interpolated Data Using Object Based Encodig of Interpolated Results", U.S. Appl. No. 13/037,322, filed Feb. 28, 2011.

Williamson, "Systems and Methods for Generating Interpolation Data Template to Normalize Analytic Runs", U.S. Appl. No. 13/037,332, filed Feb. 28, 2011.

Williamson, "Systems and Methods for Generating Interpolation Data Sets Converging to Optimized Results Using Iterative Overlapping Inputs", U.S. Appl. No. 13/037,341, filed Feb. 28, 2011.

Williamson, "Systems and Methods for Validating Interpolation Results Using Monte Carlo Simulations on Interpolated Data Inputs", U.S. Appl. No. 13/037,344, filed Feb. 28, 2011.

ASPFAQ.com, "What are the valid styles for converting datetime to string?", (2006) http://database.aspfaq.com/database/what-are-the-valid-styles-for-converting-datetime-to-string.html.

Answering Joint Queries from Multiple Aggregate OLAP Databases, Pourabbas et al, LNCS 2737, pp. 24-34, 2003.

Office Action for U.S. Appl. No. 12/475,452 mailed Aug. 12, 2011.
Office Action for U.S. Appl. No. 12/475,439 mailed Apr. 29, 2011.
Office Action for U.S. Appl. No. 12/475,439 mailed Nov. 10, 2010.
Office Action for U.S. Appl. No. 12/475,441 mailed Jul. 25, 2011.
Office Action for U.S. Appl. No. 12/475,459 mailed Jun. 6, 2011.
Office Action for U.S. Appl. No. 12/475,460 mailed Aug. 15, 2011.
USPTO Office Action for U.S. Appl. No. 12/475,439 mailed Feb. 22, 2012.
USPTO Office Action for U.S. Appl. No. 12/475,441 mailed May 7, 2012.
USPTO Office Action for U.S. Appl. No. 12/475,459 mailed Feb. 28, 2012.
USPTO Office Action for U.S. Appl. No. 12/475,460 mailed Apr. 19, 2012.
USPTO Office Action for U.S. Appl. No. 12/475,419 mailed Feb. 22, 2012.
USPTO Office Action for U.S. Appl. No. 12/475,452 mailed May 16, 2012.
USPTO Office Action for U.S. Appl. No. 12/551,428 mailed Mar. 30, 2012.
USPTO Office Action for U.S. Appl. No. 12/551,393 mailed Dec. 27, 2011.
USPTO Office Action for U.S. Appl. No. 12/551,330 mailed Dec. 7, 2011.
U.S. Appl. No. 12/551,476, Systems and Methods for Generating Rapidly Rotatable Dimensional View of Data Objects, filed Aug. 31, 2009.
U.S. Appl. No. 12/551,442, Systems and Methods for Generating a Set of Linked Rotational Views of Model Objects, filed Aug. 31, 2009.
U.S. Appl. No. 12/551,428, Systems and Methods for Sets of Model Objects Having Data Messaging Pipes, filed Aug. 31, 2009.
U.S. Appl. No. 12/551,393, Systems and Methods for Managing Sets of Model Objects via Unified Management Interface, filed Aug. 31, 2009.
U.S. Appl. No. 12/551,330, Systems and Methods for Generating Dimensionally Altered Model Objects, filed Aug. 31, 2009.

* cited by examiner

US 8,417,739 B2

SYSTEMS AND METHODS FOR OBJECT-BASED MODELING USING HIERARCHICAL MODEL OBJECTS

FIELD

The present teachings relate to systems and methods for object-based modeling using hierarchical model objects, and more particularly to platforms and techniques for dedicated modeling of technical, medical, financial, and other systems which are configured to generate a model object constituted of a set of nested or hierarchical objects which can be accessed, viewed or manipulated at various depths, and which hierarchical model object is capable of being programmatically imported and exported objects to external mainframe platforms, and other resources.

BACKGROUND OF RELATED ART

A spectrum of modeling platforms and options exist today for engineers, managers, developers and other professionals. In the case of engineering, medical, technical, financial, and other advanced modeling resources, a range of platforms are available for users interested in setting up, running and maintaining financial modeling systems. For example, organizations interested in relatively sophisticated modeling applications, such as geophysical models for detecting oil reserves or other geologic features or equity market analysis based on Black-Sholes option pricing models, a company or other organization may choose to install advanced modeling software on mainframe-class computers to run those classes of models and obtain various projections, reports, and other results. Such mainframe-level or other large-scale installations, however, can involve costs on the order of millions of dollars or more, and may require the full time attention of highly skilled professionals, including programmers and managers with advanced training. As a consequence, putting a mainframe-based modeling operation into place may not be practical or possible for many organizations or users.

On the other end of the spectrum, managers, engineers and others may employ widely available entry-level applications to capture operational data and attempt to develop predictive models for engineering, financial, medial, and other applications. That class of applications can include, for example, consumer or business-level spreadsheet, database, or data visualization programs for technical, financial, and other purposes. For instance, a manager of a manufacturing facility may use a commercially available spreadsheet application to enter production numbers, schedules, and other details of that site. However, attempting to extract useful modeling outputs from those classes of applications can be difficult or impossible. For one, spreadsheet, database, and other widely available applications are typically built to produce reports based on already existing data, but not to generate modeling outputs or objects that represent predictive outputs or scenarios. For another, existing spreadsheet, database, and other applications typically involve limitations on cell size, number of dimensions, overall storage capacity, and other program parameters which, in the case of large-scale modeling operations, may be insufficient to operate on the data sets necessary to produce and run meaningful models.

For another, the data structures and outputs of existing spreadsheet, database and other entry-level or commonly available applications are typically arranged in proprietary format, rather than a widely interoperable object-based or other universal format. As still another drawback, the cells, rows, columns, and other data elements within commonly available spreadsheets, databases, and other entry-level programs can not be extracted as separate units and exported to other modeling or analytic tools, nor can slices of spreadsheets or databases be independently updated from within conventional application tools.

One result of these limitations is that copied cells or other data elements lose finer-resolution data when copied or moved to another data location, so that, for instance, the individual sales figures which combine to create a gross sales number are all lost when the cell containing the gross figure is copied or moved. In short, the use of spreadsheet, database, and other consumer or business-level applications to conduct modeling operations involves significant shortcomings, due in part to the fact that those classes of platforms are not designed to reliable handle modeling functionality. At present, therefore, a manager, developer, engineer, or other professional or user with modeling requirements is faced with a choice between installing a large and expensive mainframe-based solution with its attendant infrastructure, a spreadsheet or database-based entry level solution with its attendant limitations on power and data handling, or a combination of those two types of platforms. It may be desirable to provide object-based or object-compatible modeling platforms capable of generating modeling objects which encapsulate various modeling features, which preserve multi-layer data attributes, which are exportable to other external modeling tools, and which can be readily extracted from existing database sources.

DESCRIPTION OF THE DRAWINGS

The accompanying drawings, which are incorporated in and constitute a part of this specification, illustrate embodiments of the present teachings and together with the description, serve to explain the principles of the present teachings. In the figures.

DESCRIPTION OF EMBODIMENTS

Embodiments of the present teachings relate to systems and methods for object-based modeling using a hierarchical model object having multiple object layers. More particularly, embodiments relate to platforms and techniques that can access, extract, and generate modeling objects in a native object-based or object-compatible format from a spreadsheet, database, or other source source. The modeling objects produced via a modeling client or other modeling tool according to the present teachings can encapsulate both source data describing a physical, medical, technical, financial, or other process or phenomena, and modeling attributes that relate the source data to predictive scenarios, specific models, and other features. In embodiments, the modeling objects can be extracted or "lifted" from data sources such as database programs or others, and stored to local storage of a local modeling client. The model objects can be made visible or available via the desktop or other user interface of the modeling client. In various embodiments, the model objects can themselves be built out of a layered set of component model objects which are stored, linked, or associated together in a resulting composite hierarchical model object. These and other embodiments described herein address the various noted shortcomings in known modeling technology, and provide a user or operator with enhanced modeling power on a desktop or other client, allowing the extraction and generation of a hierarchical model object whose constituent or component model objects can be independently accessed, updated, and stored at different levels of the hierarchy and corresponding levels of detail or granularity, as object-based entities. Systems and methods according to the present teachings also allowing seamless generation, local storage, and communication of model objects to backend mainframe platforms or data centers, middleware servers, other modeling clients, and/or other local or remote modeling, storage, or data processing resources.

Reference will now be made in detail to exemplary embodiments of the present teachings, which are illustrated in the accompanying drawings. Where possible the same reference numbers will be used throughout the drawings to refer to the same or like parts.

Figure 1:
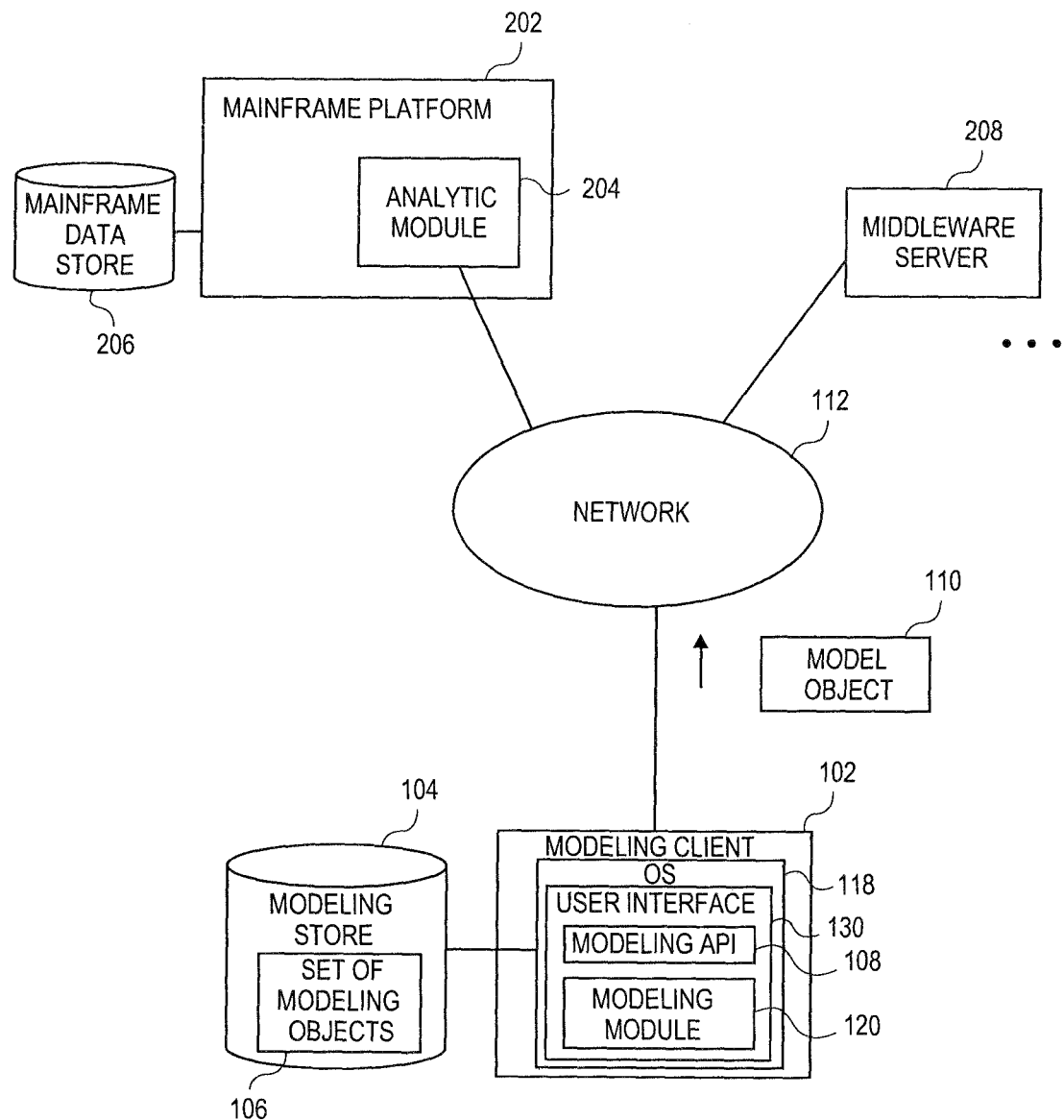
FIG. 1 illustrates an overall system for a modeling network including various hardware and connectivity resources that can be used in systems and methods for object-based modeling using hierarchical model objects, according to various embodiments of the present teachings.

FIG. 1 illustrates an overall network in which systems and methods for object-based modeling using hierarchical model objects can operate, consistent with various embodiments of the present teachings. In embodiments as shown, a modeling client 102 can communicate with a variety of local and remote resources, including a mainframe platform 202 via one or more network 112. Client 102 can be or include, for instance, a personal computer, a server, a dedicated workstation, a mobile device, or other machine, device, hardware, or resource. One or more network 112 can be or include, for example, the Internet, a virtual private network (VPN), a local area network such as an Ethernet™ network, or other public or private network or networks. Mainframe platform 202 can be or include commercially available platforms or installations, such as, merely for example, mainframe or enterprise platforms available from SAP Inc. of Walldorf, Germany, and other sources.

Mainframe platform 202 can include modules, logic, and functionality to perform an array of computation and data storage tasks, including data warehousing, data mining, statistical analyses, financial planning, inventory management, customer resource management, engineering design, and other applications. In implementations as shown, mainframe platform 202 can host or communicate with a variety or resources including, merely illustratively a mainframe data store 206, and logic or applications including an analytic module 204. Mainframe platform 202 can contain, host, support, or interface to other data processing hardware, software, and other resources. In embodiments, modeling client 102 can likewise communicate with other local or remote resources, such as a middleware server 208 hosting or interfacing to a set of data stores for online analytical processing (OLAP) or other functions. Modeling client 102 can also communicate or interface with other local or remote servers, services, data stores, or other resources.

In embodiments as shown, modeling client 102 can operate under an operating system 118, such as a distribution of the Linux™, Unix™, or other open source or proprietary operating system. Modeling client 102 can present a user interface 130, such as a graphical user interface or command line interface, operating under operating system 118 to receive commands and inputs from a user, and operate modeling client 102. Modeling client 102 can communicate with storage resources including a modeling store 104, such as a local or remote database or data store. Modeling store 104 can store a set of modeling objects 106, in which data, functions, procedures, attributes, and/or other information related to one or more modeling object 110 can be encapsulated and stored. In embodiments, modeling object 110 can be encoded in extensible markup language (XML) format. In embodiments, modeling object 110 can be encoded in other object-based or object-compatible formats or data structures. Modeling client 102 can communicate with mainframe platform 202 via a modeling application programming interface (API) 108. Modeling application programming interface (API) 108 can include, for instance, defined function calls or calls to other routines, calculations, or features, as well as data structures and parameters associated with modeling operations. For example, modeling application programming interface (API) 108 can include a function call to invoke a Monte Carlo simulation model based on a set of supplied data, such as an identified set of dimensions extracted from a spreadsheet or database. Other functions, routines, resources, and features can be called, invoked, or instantiated via modeling application programming interface (API) 108. According to embodiments in various regards, one or more local or remote modeling packages, modules, or other supporting applications can be instantiated via modeling module 120 and modeling application programming interface (API) 108 to manipulate source data and resulting one or more modeling object 110.

In embodiments, a user of modeling client 102 can access, modify, or add data modeling objects to a set of data modeling object 106 via a modeling module 120 hosted in modeling client 102. Set of data modeling objects 106 can include data objects that the user of modeling client 102 has directly entered, or, in aspects, which the user of modeling client has imported or extracted from sources such as consumer or business-level spreadsheet, database, and/or other applications or platforms. Modeling module 120 can itself be or include applications, software modules or hardware modules, or other logic or resources to operate on set of modeling objects 106. Modeling module 120 can, merely illustratively, include or access logic or modules for invoking and manipulating a variety of scientific, technical, engineering, medical, financial, manufacturing, or other modeling operations. For instance, modeling module 120 can be or include applications or logic for performing Monte Carlo simulations, finite element analyses, Black-Scholes option pricing or other market analyses, epidemiological projections, geophysical models or simulations, or other simulations, models, trend mappings, projections, or other predictive processes. In embodiments in one regard, after invoking modeling module 120 and performing any modeling task, the user of modeling client 102 can locally store and/or export one or more modeling object 110 to external platforms or resources.

In embodiments as shown, the user of modeling client 102 can for instance export or communicate one or more modeling object 110 to mainframe platform 202 via modeling application programming interface (API) 108, for storage and use at a local or remote location from within that platform. In aspects, mainframe platform 202 can receive modeling object 110 directly, without a necessity for translation, re-formatting, or invoking any spreadsheet, database, or other application from which data encapsulated in one or mode modeling object 110 originated. In aspects, mainframe platform 202 can operate on one or more modeling object 110, and transmit or return that data or other results to modeling client 102 via modeling application programming interface (API) 108. Thus, according to aspects of the present teachings, modeling objects can be exchanged directly and programmatically between modeling client 102, mainframe platform 202 or other larger-scale or remote platforms, including for instance middleware server 208 or other comparatively large-scale or higher-capacity modeling or analytic tools.

Figure 2:
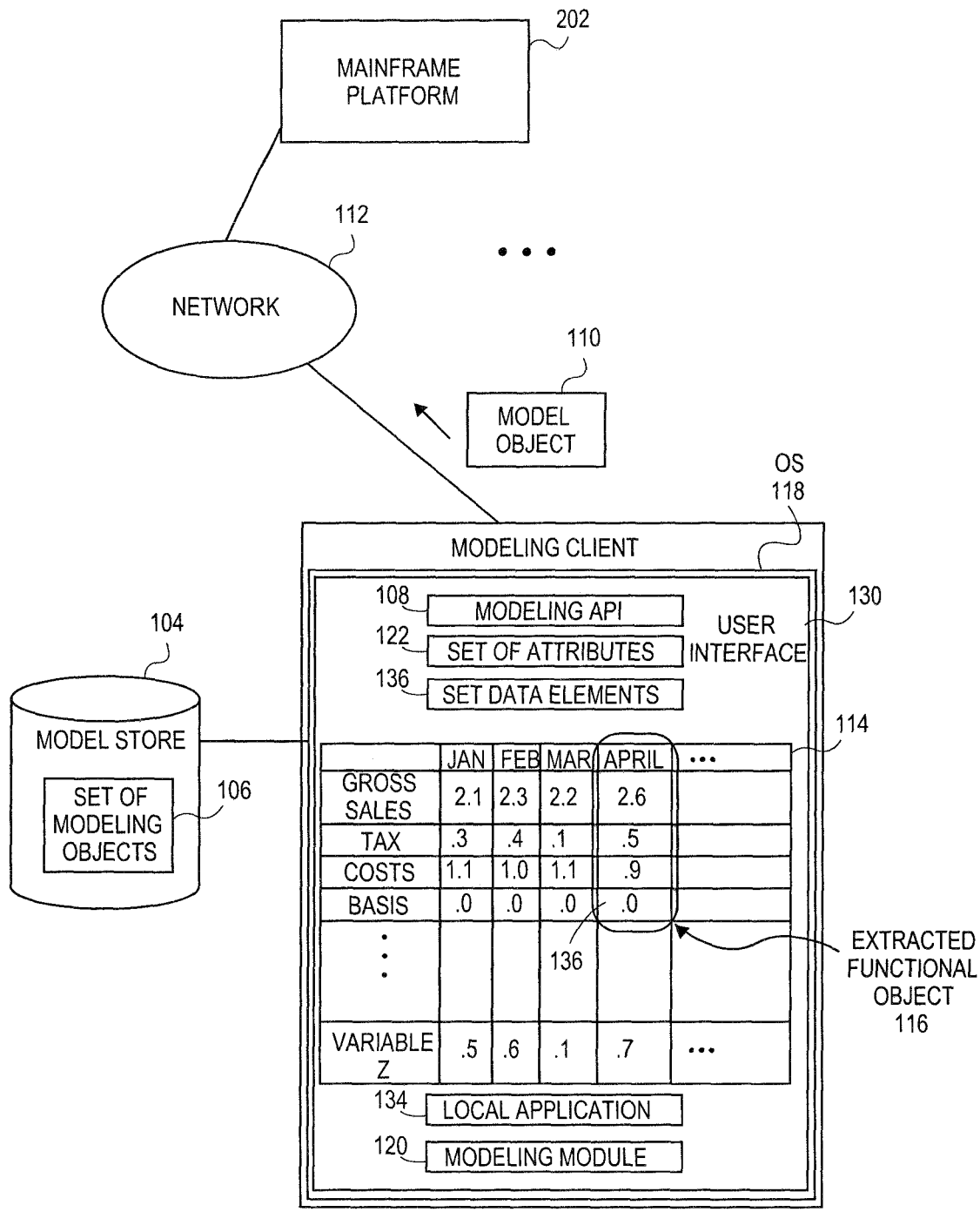
FIG. 2 illustrates an exemplary modeling network including a modeling server and connectivity resources, according to various embodiments.

In terms of operating on source data and generating one or more modeling object 110 for local storage and/or exchange with mainframe platform 202 or other platforms, and as shown for instance in FIG. 2, according to various embodiments, a user of modeling client 102 can invoke modeling module 120 to manipulate a set of source data 114 to identify, configure, and/or extract the functional objects, attributes, or other features of a set of data to produce a modeling output. In embodiments as shown, modeling module 120 can access a set of source data 114, from which data, attributes, and/or other metadata can be extracted to generate one or more modeling object 110. In aspects, set of source data 114 can be generated, hosted, or stored by or in a local application 134, such as a spreadsheet, database, accounting, word processing, presentation, or other application or software. In aspects, set of source data 114 can comprise data previously or newly generated in the form of an object-based modeling object, such as a modeling object entered, imported, or specified by the user of modeling client 102. In aspects, set of source data 114 can comprise data originally stored or generated in a consumer or business-level spreadsheet, database, and/or other application or software. In aspects, set of source data 114 can be initially formatted or encoded in a non-object oriented format, such as in a cellular array or in a relational database format. In aspects, set of source data 114 can be initially formatted or encoded in an object-oriented format, such as extensible markup language (XML) format. In aspects, a user of modeling client 102 can highlight, select, or otherwise specify all or a portion of set of source data 114 to generate one or more extracted functional object 116. For instance, a user can highlight a column of set of source data 114 to identify and extract data as well as functional relationships of interest, to the user, as a unified object. Thus, purely illustratively and as shown, a user may wish to obtain a view on a current month's sales figures including gross sales, tax, production or delivery costs, and cost basis, as well as other parameters related to sales activity. In aspects as shown, a user can, for instance, highlight those functional relationships by dragging a cursor or otherwise selecting a set of cells to group together, and form one or more extracted functional object 116. In aspects, selection can include the extraction of set of data elements 136, such as values stored in spreadsheet cells or database entries. In aspects, once a set of data elements 136 are selected, the functional, computational, or other modeling parameters associated with that data can be stored or associated with one or more extracted functional object 116. For instance, modeling module 120 can store associated routines, computations, processes, or other attributes or functional specifications for one or more extracted functional object 116 in set of attributes 122, which can be stored or associated with one or more extracted functional object 116. In aspects, set of attributes 122 can include the identification of or linkage to any routines, interfaces, or other functional or computational resources that will be associated with one or more extracted functional object. According to various embodiments, analytic module 204 of mainframe platform 202, or other resource or platform receiving one or more extracted functional object 116 from modeling client 102 can thereby obtain both data values derived or obtained from set of source data 114, as well as functional or procedural resources and relationships associated with that data. One or more extracted functional object 116 along with any associated set of attributes 122 can be encoded or stored in one or more modeling object 110, which can thereby be transparently exported to mainframe platform 202, middleware server 208, or other platforms or destinations for further modeling operations.

Figure 3:
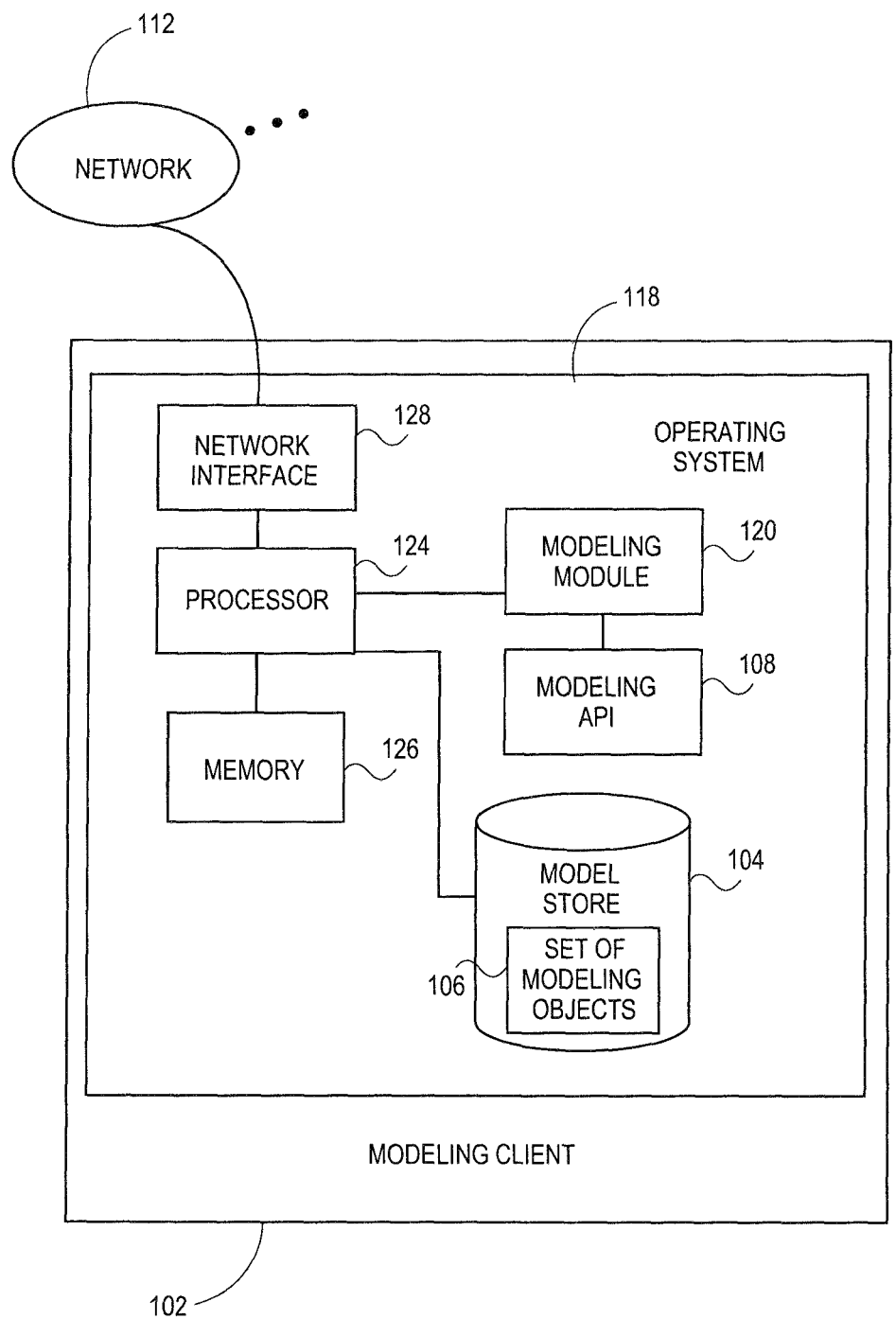
FIG. 3 illustrates an exemplary hardware configuration for a modeling server that can be used in systems and methods for object-based modeling using hierarchical model objects, according to various embodiments.

FIG. 3 illustrates an exemplary diagram of hardware, software, connectivity, and other resources that can be incorporated in a modeling client 102 configured to communicate with one or more network 112, including to interface with mainframe platform 202, middleware server 208, and/or other local or remote resources. In embodiments as shown, modeling client 102 can comprise a processor 124 communicating with memory 126, such as electronic random access memory, operating under control of or in conjunction with operating system 118. Operating system 118 can be, for example, a distribution of the Linux™ operating system, the Unix™ operating system, or other open-source or proprietary operating system or platform. Processor 124 also communicates with a model store 104, such as a database stored on a local hard drive, which may store or host set of modeling objects 106. Processor 124 further communicates with network interface 128, such as an Ethernet or wireless data connection, which in turn communicates with one or more networks 112, such as the Internet, or other public or private networks. Processor 124 also communicates with modeling module 120 along with modeling application programming interface (API) 108 and/or other resources or logic, to execute control and perform modeling calculation, translation, data exchange, and other processes described herein. Other configurations of the network modeling client 102, associated network connections, and other hardware and software resources are possible. While FIG. 3 illustrates modeling client 102 as a standalone system comprises a combination of hardware and software, modeling client 102 can also be implemented as a software application or program capable of being executed by a conventional computer platform. Likewise, modeling client 102 can also be implemented as a software module or program module capable of being incorporated in other software applications and programs. In either case, modeling client 102 can be implemented in any type of conventional proprietary or open-source computer language.

Figure 4:
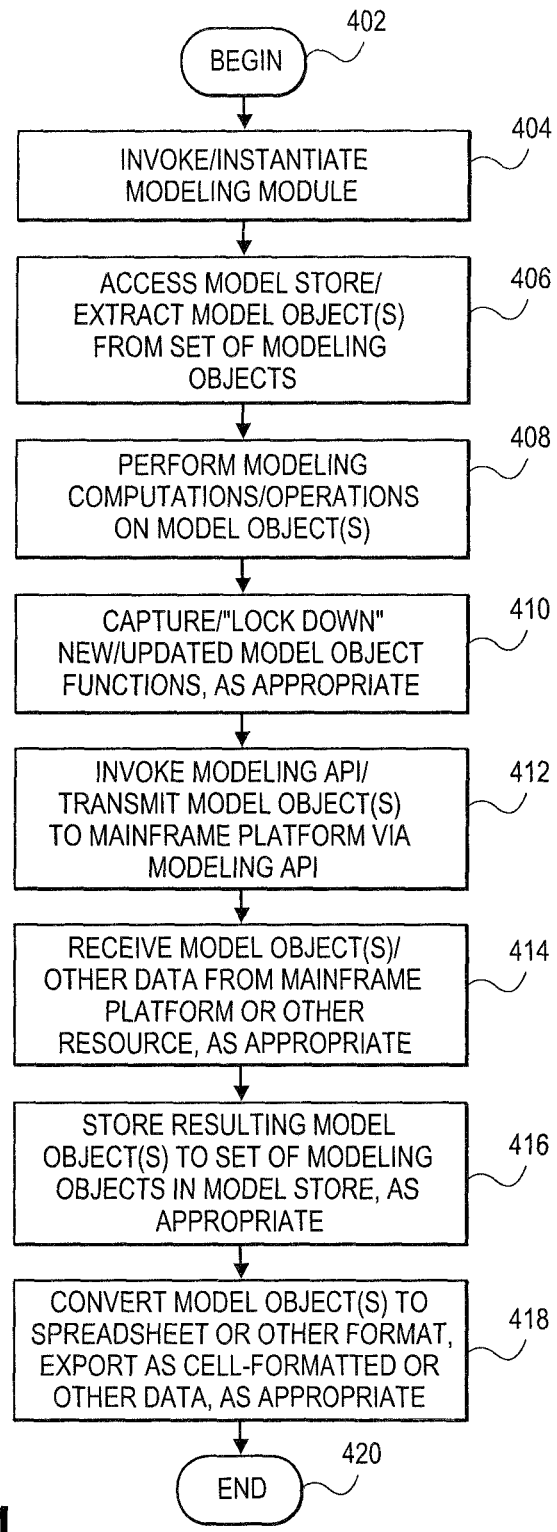
FIG. 4 illustrates a flow diagram of overall modeling processing for object-based modeling associated with extraction of database dimensions and other data as a modeling object, according to various embodiments.

FIG. 4 illustrates a flow diagram of overall object model processing that can be used in systems and methods for object-based modeling using hierarchical model objects, according to various embodiments. In 402, processing can begin. In 404, a user of modeling client 102 or other client or device can invoke or instantiate modeling module 120 or other logic, to perform modeling operations. In 406, modeling module 120 can access model store 104 and extract one or more modeling object 110 from set of modeling objects 106. In 408, modeling computations or other operations can be performed on one or more modeling object 110. For example, a modeling operation can be performed to project or predict the output of a factory based on various supply scenarios for parts, materials, energy costs, or other variables. In 410, the values, functions, linkages, or other attributes of one or more data modeling object 110 that were accessed, produced, or modified by the modeling operations can be captured, fixed, or locked down by modeling module 120. For instance, the resulting one or more modeling object 110 can be stored to set of modeling objects 106 in model store 104, or other databases or data stores.

In 412, modeling application programming interface (API) 108 can be invoked by modeling module 120, by mainframe platform 202, or other resources to transfer one or mode modeling object 110 to mainframe platform 202. In embodiments, one or more modeling object 110 can for instance be communicated to mainframe platform 202 via a secure connection or channel, such as a secure socket layer (SSL) connection, via a channel encrypted using a public/private key infrastructure, or other channel or connection. In 414, one or more model object 110 can be received in modeling module 120 from mainframe platform 202 or other resource, as appropriate. For example, an updated version of one or more model object 110 reflecting new data, new modeling results, or other information can be received in modeling module 120. In 416, the resulting new, updated, or modified one or more model object 110 can be stored to set of modeling objects 106 in model store 104, as appropriate. In embodiments, one or more model objects 110 can in addition or instead be stored to mainframe data store 206, to middleware server 208, to another modeling client or other client, or other site or destination. In 418, modeling module 120 can convert one or more model objects 110 to spreadsheet, database, or other format, and export any converted data as a set of cell-formatted information, or data encoded in other formats. For instance, modeling module 120 can convert or translate one or more model objects to cell data values or database entries, and export that data to client-level applications on modeling client 102 or other local or remote devices or storage. In 420, processing can repeat, return to a prior processing point, jump to a further processing point, or end.

Figure 5:
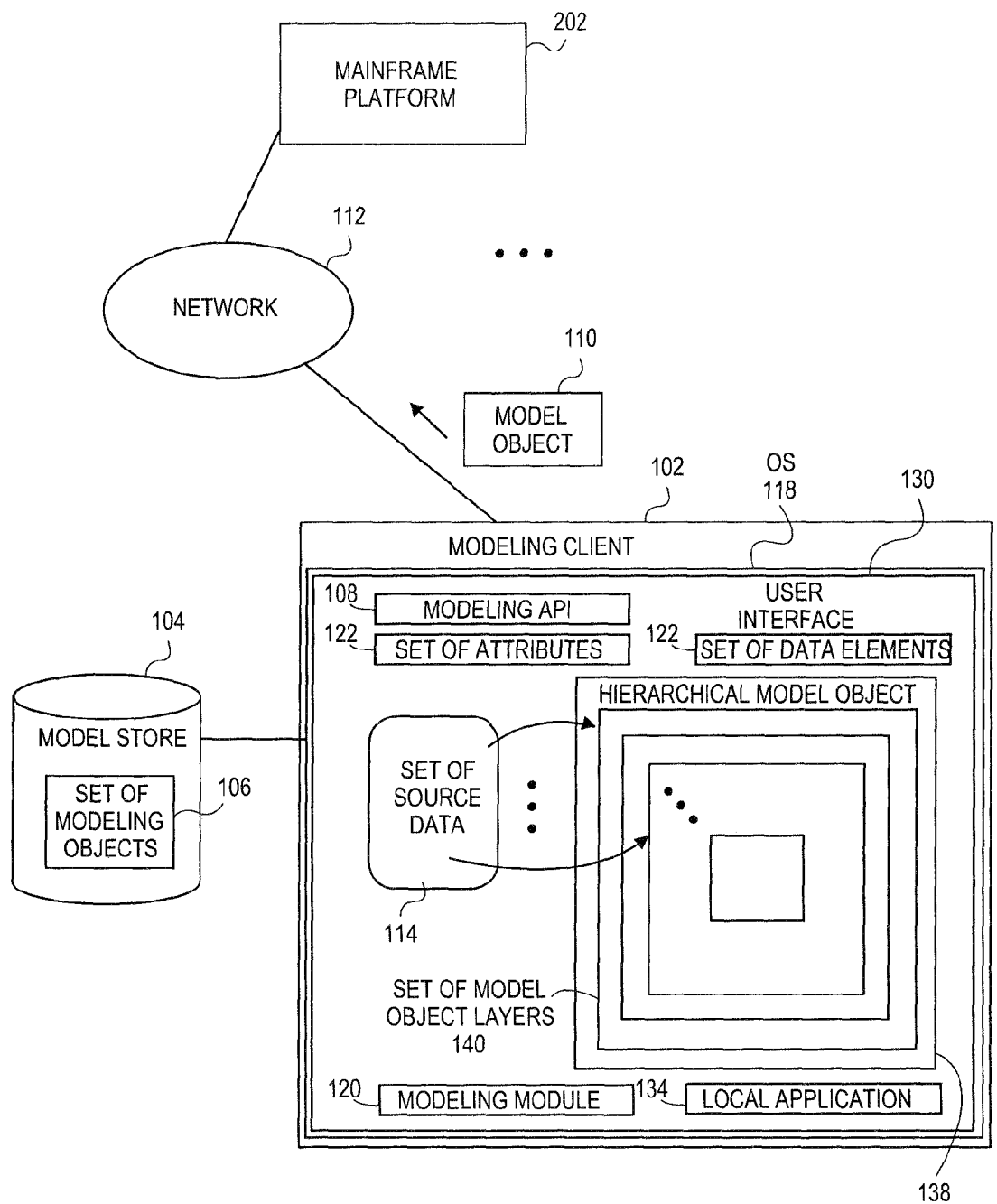
FIG. 5 illustrates exemplary operations to generate a hierarchical model object having multiple model object layers, according to various embodiments.

According to various embodiments of the present teachings, and as for example generally illustrated in FIG. 5, in implementations modeling module 120 can generate one or more hierarchical model object 138 set of source data 114 and extract multiple constituent objects. In embodiments as shown, a user of modeling client 102 can access a set of source data 114, such as spreadsheet, database, or other data, and select data elements, functions and other attributes, and other information to generate a set of model object layers 140. In embodiments, each model object making up set of model object layers 140 can be extracted and configured according to techniques described herein. In embodiments, each model object making up set of model object layers 140 can have data elements, dimensions, functions or other attributes which are in common, overlapping, and/or separate from each other. In embodiments, modeling module 120 can aggregate set of model object layers 140 into a hierarchical model object 138. Hierarchical model object 138 can aggregate, store or link the set of model object layers 140 to create a joined or combined hierarchical model object. In various embodiments, each layer in set of model object layers 140 can be linked to or associated with a next layer in the order or hierarchy of hierarchical model object 138. In embodiments, different layers in set of model object layers 140 can be linked to or associated with one or more layers at different levels in hierarchical model object 138. According to embodiments in various regards, the hierarchical model object 138 can in one regard permit a user, for instance, to traverse the various layers or levels in set of model object layers 140, and access, view, manipulate, update, and/or store data at those various levels. In embodiments, therefore, a user can for example view data extracted from a source cell that represents a gross sales figure for a product or company, and move up or down set of model object layers 140 to view or update different component sales figures from which the gross sales value is derived. Various other layers, attributes, and calculations can be performed via the hierarchical encoding of data in hierarchical model object 138.

According to embodiments in further regards, and in contrast to views on conventional spreadsheet, database, or other data structures, each layer of model objects in set of model object layers 140 making up hierarchical model object 138 can be accessed, updated, and stored independently of the other constituent objects, while maintaining all linkages and functionality of hierarchical model object 138. In embodiments, a user in one regard can independently updated a selected component model object, without having to overwrite the entire hierarchical model object 138 and all remaining objects in set of model object layers 140. In embodiments, the component objects in set of model object layers 140 can also be independently updated via multiple modeling tools or other logic, operating simultaneously or otherwise.

It may be noted that while hierarchical model object 138 encapsulating the set of model object layers 140 can be stored or hosted in modeling client 102, in embodiments, model object 110 can also or instead be transmitted to other local or remote platforms, such as mainframe platform 202, middleware servers, other modeling or other clients, or other destinations.

Figure 6:
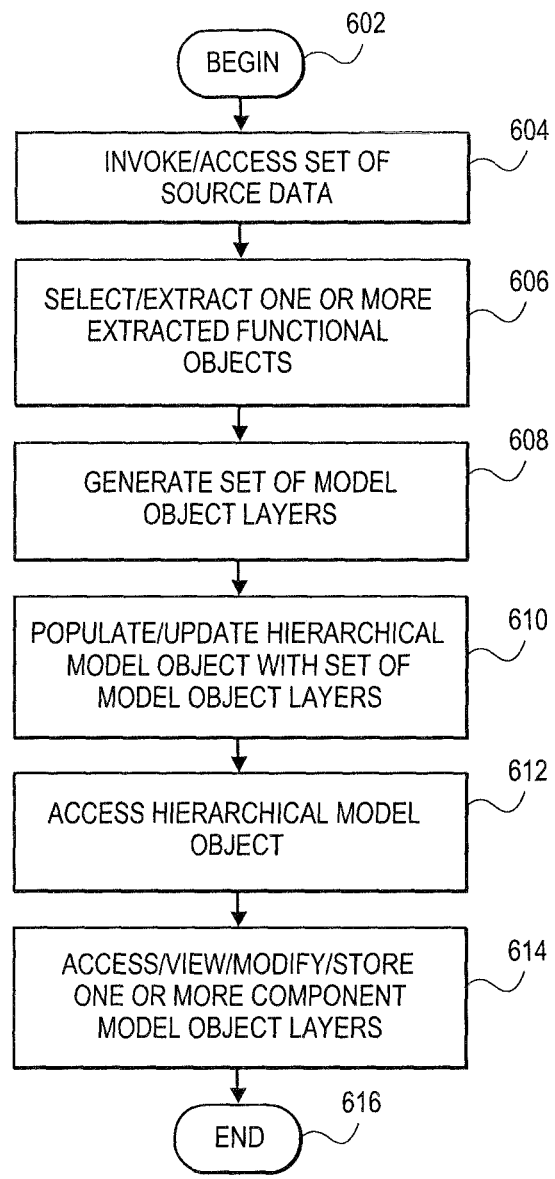
FIG. 6 illustrates a flow diagram of processing to generate a hierarchical model object having multiple object layers, according to various embodiments.

FIG. 6 illustrates a flow diagram of overall processing to generate and manipulate one or more hierarchical model object 138 extracted from one or more set of source data 114, according to various embodiments. In 602, processing can begin. In 604, a user can invoke or access one or more set of source data 114, such as spreadsheet, database, presentation, word processing, or other data. In 606, a user can operate modeling module 120 or other tool to select and extract one or more extracted functional object 116 from set of source data 114. In 608, a set of model object layers 140 can be generated via modeling module 120, for instance, to capture different slices, layers, levels, dimensions, or other subsets of set of source data 114. In 610, modeling module can populate a hierarchical model object 138 with set of model object layers 140, thereby creating a hierarchical object entity encapsulating those constituent or underlying objects in a set of levels or layers. In embodiments, the levels or layers can be linked in a tree, node, web, or other structure. In 612, a user can access the resulting hierarchical model object 138, for instance using modeling module 120 or other tool. In 614, one or more of the component model objects of set of model object layers 140 can be accessed, viewed, modified, updated, and/or stored, for instance, to model store 104 or other data store, independently of the other component model objects in set of model object layers 140. In aspects, independent updating on constituent objects and layers can be done, in one regard, because set of model object layers 140 can be encoded and stored as separate entities, with linkages or other defined relationships with each other and/or to hierarchical model object 138. In embodiments, different layers of set of model object layers 140 can reveal data elements or functions at different levels, for instance to show a corporate organizational chart, geographic map, or other data at various levels of detail or "zoom." In 616, processing can repeat, return to a prior processing point, jump to a further processing point, or end.

The foregoing description is illustrative, and variations in configuration and implementation may occur to persons skilled in the art. For example, while embodiments have been described wherein one or more model object 110 is accessed and manipulated via one modeling client 102, in embodiments, one or more users can use multiple modeling clients, or networks including modeling clients or other resources, to operate on model object data. For further example, while embodiments have been described in which modeling client 102 may interact with one mainframe platform 202 and/or one middleware server 208, in embodiments, one or more modeling client 102 can interact with multiple mainframe platforms, data centers, middleware servers, and/or other resources, in various combinations. Yet further, while embodiments have been described in which a modeling client 102 interacts with a mainframe platform 202 and/or middleware server 208, in embodiments, rather than interact with large-scale mainframe platforms, data centers, or middleware servers, modeling client 102 can interact with other local or remote modeling clients, networks of those clients, or, in embodiments, can operate to perform modeling operations on a stand-alone basis, without necessarily communicating with other modeling platforms. Other resources described as singular or integrated can in embodiments be plural or distributed, and resources described as multiple or distributed can in embodiments be combined. The scope of the present teachings is accordingly intended to be limited only by the following claims.

What is claimed is:

1. A method comprising:
   executing an instance of a multi-dimensional relational database application, the multi-dimensional relational database application comprising a set of source data;
   selecting a first portion of source data from the instance of the multi-dimensional relational data application to extract a first set of data elements and a first set of functional relationships describing relationships between values of the first set of data elements;
   encapsulating the first set of data elements and the first set of functional relationships, in a first predictive model object layer;
   selecting a second portion of source data to extract a second set of data elements and a second set of functional relationships corresponding to the second set of data elements;
   encapsulating the second set of data elements and the second set of functional relationships, in a second predictive model object layer, wherein each of the first predictive model object layer and the second predictive model object layer reveal data elements of the other predictive model object layer;
   aggregating, by a processor, the first predictive model object layer and the second predictive model object layer to create a hierarchical predictive model object, wherein a value predicted by the hierarchical predictive model object is derived from at least one of the data elements of at least one of the first predictive model object layer or the second predictive model object layer; and
   generating a predicted output using data elements and functional relationships for each layer in the hierarchical predictive model object.

2. The method of claim 1, wherein the first predictive model object layer and the second predictive model object layer are selectively accessible via the hierarchical predictive model object.

3. The method of claim 1, wherein the first predictive model object layer and the second predictive model object layer comprise at least one component model object encoded in extensible markup language (XML) format.

4. The method of claim 1, wherein at least one of the first predictive model object layer or the second predictive model object layer comprises at least one data element from at least two other predictive model object layers of a plurality of predictive model object layers.

5. The method of claim 1, wherein a dimension in the multi-dimensional relational database comprises at least one of a row, a column, or a cell.

6. The method of claim 1, wherein the set of source data comprises at least one attribute, the at least one attribute comprising at least one of a function call parameter or a linkage parameter.

7. The method of claim 1, wherein the first predictive model object layer and the second predictive model object layer are independently updatable via at least one modeling module.

8. The method of claim 1, wherein the hierarchical predictive model object is exportable via an application programming interface (API).

9. The method of claim 1, wherein the set of source data is hosted in at least one of local storage of a client computer or remote storage.

10. A client system, comprising:
    an interface to a set of source data; and
    a processor coupled to the interface, the processor being configured to:
      execute an instance of a multi-dimensional relational database application, the multi-dimensional relational database application comprising the set of source data;
      select a first portion of source data from the instance of the multi-dimensional relational data application to extract a first set of data elements and a first set of functional relationships describing relationships between values of the first set of data elements;
      encapsulate the first set of data elements and the first set of functional relationships, in a first predictive model object layer;
      select a second portion of source data to extract a second set of data elements and a second set of functional relationships corresponding to the second set of data elements;
      encapsulate the second set of data elements and the second set of functional relationships, in a second predictive model object layer, wherein each of the first predictive model object layer and the second predictive model object layer reveal data elements of the other predictive model object layer;
      aggregate the first predictive model object layer and the second predictive model object layer to create a hierarchical predictive model object, wherein a value predicted by the hierarchical predictive model object is derived from at least one of the data elements of at least one of the first predictive model object layer or the second predictive model object layer; and
      generate a predicted output using data elements and functional relationships for each layer in the hierarchical predictive model object.

11. The system of claim 10, wherein the first predictive model object layer and the second predictive model object layer are selectively accessible via the hierarchical predictive model object.

12. The system of claim 10, wherein the first predictive model object layer and the second predictive model object layer comprise at least one model object encoded in extensible markup language (XML) format.

13. The system of claim 10, wherein at least one of the first predictive model object layer or the second predictive model object layer comprises at least one data element from at least two other predictive model object layers of a plurality of predictive model object layers.

14. The system of claim 10, wherein a dimension in the multi-dimensional relational database comprises at least one of a row, a column, or a cell.

15. The system of claim 10, wherein the set of source data comprises at least one attribute, the at least one attribute comprising at least one of a function call parameter or a linkage parameter.

16. The system of claim 10, wherein the first predictive model object layer and the second predictive model object layer are independently updatable via at least one modeling module.

17. The system of claim 10, wherein the hierarchical predictive model object is exportable via an application programming interface (API).

18. The system of claim 10, where the set of source data is hosted in at least one of local storage of the client system or remote storage.

19. A non-transitory computer readable storage media including instructions, that when executed by a processor, cause the processor to perform a method comprising:

executing an instance of a multi-dimensional relational database application, the multi-dimensional relational database application comprising a set of source data;

selecting a first portion of source data from the instance of the multi-dimensional relational data application to extract a first set of data elements and a first set of functional relationships describing relationships between values of the first set of data elements;

encapsulating the first set of data elements and the first set of functional relationships, in a first predictive model object layer;

selecting a second portion of source data to extract a second set of data elements and a second set of functional relationships corresponding to the second set of data elements;

encapsulating the second set of data elements and the second set of functional relationships, in a second predictive model object layer, wherein each of the first predictive model object layer and the second predictive model object layer reveal data elements of the other predictive model object layer;

aggregating, by the processor, the first predictive model object layer and the second predictive model object layer to create a hierarchical predictive model object, wherein a value predicted by the hierarchical predictive model object is derived from at least one of the data elements of at least one of the first predictive model object layer or the second predictive model object layer; and generating a predicted output using data elements and functional relationships for each layer in the hierarchical predictive model object.

20. The non-transitory computer readable storage media of claim 19, wherein the hierarchical predictive model object is exportable via an application programming interface (API).

\* \* \* \* \*